L. G. LANGSTAFF.
LIQUID DISPENSING VESSEL.
APPLICATION FILED JAN. 21, 1908.
925,000.
Patented June 15, 1909.
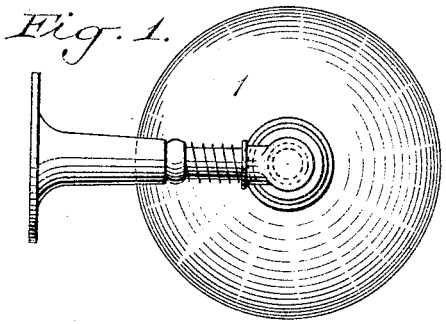
Fig. 1.
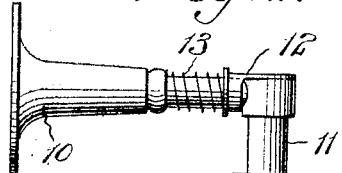
Fig. 2.
Fig. 6.
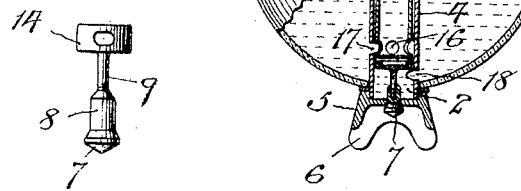
Fig. 4.
Fig. 5.
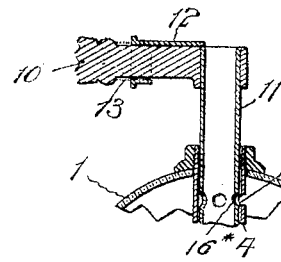
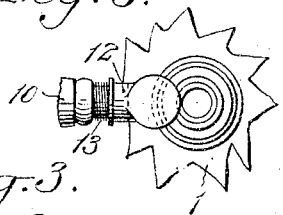
Fig. 3.
Witnesses:
F. George Barry,
Henry Thiele.
Inventor.
Lewis G. Langstaff
by attorneys

UNITED STATES PATENT OFFICE.

LEWIS G. LANGSTAFF, OF NEW YORK, N. Y.

LIQUID-DISPENSING VESSEL.

No. 925,000.

Specification of Letters Patent.

Patented June 15, 1909.

Application filed January 21, 1908. Serial No. 411,953.

*To all whom it may concern:*

Be it known that I, LEWIS G. LANGSTAFF, a citizen of the United States, and resident of the borough of Brooklyn, in the city and State of New York, have invented a new and useful Improvement in Liquid-Dispensing Vessels, of which the following is a specification.

The object of my invention is to provide a very simple and effective device for insuring the delivery of a predetermined quantity of liquid from a vessel and it is more particularly directed to vessels arranged to dispense liquid soap.

In the accompanying drawings, Figure 1 is a top plan view of my improved vessel and the means for supporting the same, Fig. 2 is a side view of the same partially in vertical central section, Fig. 3 is a detail vertical central section showing the position of the parts when the vessel is raised for dispensing the liquid, Fig. 4 is a detail vertical central section taken at the top of the vessel and showing a portion of its supporting bracket, the filling cover being shown moved back to open communication to the interior of the vessel, Fig. 5 is a detail top plan view of the same, and Fig. 6 is an enlarged detail side view of the valve and its disk.

The vessel is herein represented as of a hollow spherical form and is denoted by 1. This vessel is provided at its bottom with a liquid dispensing chamber 2 having a centrally arranged discharge port 3. The liquid dispensing chamber is formed by providing the vessel 1 with a centrally arranged vertical tube 4, the lower end of which tube projects through the bottom of the vessel and is there engaged by a screw threaded cap 5 which forms the bottom of the dispensing chamber. This cap is provided with hand engaging lugs 6 projecting downwardly a distance below the head of the valve 7. The stem of the valve 7 is provided adjacent to its head with an enlarged portion 8, which closely fits the discharge port 3, and a reduced portion 9 of less diameter than the said port.

The bracket which supports the vessel comprises a lateral arm 10 arranged to be secured to the wall or other suitable support and a depending tubular arm 11 which extends downwardly into the vessel 1 within the tube 4 and forms the piston for ejecting a predetermined quantity of the liquid from the dispensing chamber 2 through the discharge port 3 when the vessel is raised. This hollow piston 11 is open at its upper end to provide a filling opening exterior to the vessel 1.

A spring pressed sliding cover 12 is located on the lateral arm 10 of the bracket in position to normally close the upper end of the hollow piston 11, a spring 13 being provided which is interposed between the cover 12 and a shoulder on the arm 10. A disk 14 is loosely mounted in the lower end of the depending arm 11 of the bracket on a cross pin 15, the hole extending diametrically through the disk, through which the pin 15 passes being larger than the pin and the disk being of less diameter than the bore of the tubular arm so as to permit the disk to have a limited lateral movement in all directions. The valve 7 forms a rigid part of the disk 14 and the disk 14 forms the piston head. The slight lateral movement of the disk 14 insures the proper seating of the valve 7.

The interior of the hollow piston is open to the interior of the vessel through lower holes 16, 17, and upper holes 16*, 17*, in the depending tubular arm and the tube 4 respectively, for permitting the liquid to flow freely from the interior of the hollow piston 11 into the interior of the vessel when the vessel is being filled. The dispensing chamber 2 is open to the interior of the vessel when the vessel is in its normal lowered position through a port 18 in the tube 4, which port is closed by the hollow piston as the vessel is raised for dispensing the liquid from the said chamber.

In operation, when it is desired to dispense a portion of the liquid from within the vessel, the vessel is raised by the engagement of the hand with the lugs 6 of the cap 5. The first part of the upward movement of the vessel will serve to close the port 18. During this portion of the upward movement of the vessel, the enlarged portion 8 of the valve stem will prevent the passage of the liquid through the port 3. The further movement of the vessel will bring the discharge port 3 opposite the reduced portion 9 of the valve stem thus permitting the piston to positively eject the liquid from the dispensing chamber.

It will be seen that by permitting the valve 7 to have a limited lateral movement, it will always be centered with respect to its discharge port thus absolutely preventing the cramping and binding of the parts during their operation and also preventing any leakage of the liquid past the valve 7 when the parts are in their normal position. It will also be seen that the entire weight of the vessel is taken upon the valve 7 when the parts are in their normal position thus further insuring an absolute closure of the discharge port.

What I claim is:—

1. A vertically movable liquid containing vessel, a tube extended therethrough having a dispensing chamber at its lower end and a discharge port therefor, a stationary piston extended down into the said tube and a discharge port valve carried by the piston.

2. A vertically movable liquid containing vessel, a tube extended therethrough having a dispensing chamber at its lower end and a discharge port therefor, a stationary piston extended down into the said tube and a discharge port valve carried by the piston and movable laterally with respect to the piston.

3. A vertically movable liquid containing vessel, a tube extended therethrough having a dispensing chamber at its lower end and a discharge port therefor, a stationary hollow piston extended down into the said tube and a discharge port valve carried by the piston, the said piston having a filling hole therein exterior to the vessel.

4. A vertically movable liquid containing vessel, a tube extended therethrough having a dispensing chamber at its lower end and a discharge port therefor, a stationary hollow piston extended down into the said tube, a discharge port valve carried by the piston, said piston having a filling hole therein exterior to the vessel, and a cover for said filling hole.

5. A vertically movable liquid containing vessel, a tube extended therethrough and projecting below the bottom of the vessel, a cap secured to the lower end of the tube to form a dispensing chamber, a discharge port in the said cap, a stationary piston extended down into the tube and a discharge port valve carried by the piston.

6. A vertically movable liquid containing vessel, a bracket for supporting the vessel comprising a lateral arm arranged to be secured to the wall or other support, and a depending tubular arm extended downwardly into the vessel to form a piston, a tube extended through the vessel having a dispensing chamber at its lower end and a discharge port therefor, and a discharge port valve carried by the piston.

7. A vertically movable liquid containing vessel, a bracket for supporting the vessel comprising a lateral arm arranged to be secured to the wall or other support, and a depending tubular arm extended downwardly into the vessel to form a piston, a tube extended through the vessel having a dispensing chamber at its lower end and a discharge port therefor, and a discharge port valve carried by the piston, the said hollow piston being open at its upper end to provide a filling hole for the vessel.

8. A vertically movable liquid containing vessel, a bracket for supporting the vessel comprising a lateral arm arranged to be secured to the wall or other support, and a depending tubular arm extended downwardly into the vessel to form a piston, a tube extended through the vessel having a dispensing chamber at its lower end and a discharge port therefor, and a discharge port valve carried by the piston, the said hollow piston being open at its upper end to provide a filling hole for the vessel, and a spring pressed cover carried by the bracket for said filling hole.

In testimony, that I claim the foregoing as my invention, I have signed my name in presence of two witnesses, this seventeenth day of January 1908.

LEWIS G. LANGSTAFF.

Witnesses:
F. GEORGE BARRY,
C. S. SUNDGREN.